United States Patent [19]

DesLauriers et al.

[11] Patent Number: 5,015,507
[45] Date of Patent: May 14, 1991

[54] METHOD OF CONVERTING RUSTED SURFACE TO A DURABLE ONE

[75] Inventors: Paul J. DesLauriers, Conroe; William J. Heilman, Houston, both of Tex.

[73] Assignee: Pennzoil Products Company, Houston, Tex.

[21] Appl. No.: 304,439

[22] Filed: Jan. 31, 1989

Related U.S. Application Data

[62] Division of Ser. No. 884,175, Jul. 9, 1986, abandoned.

[51] Int. Cl.$^5$ .............................................. B32B 15/00
[52] U.S. Cl. ................................ 427/385.5; 427/386; 427/388.1; 427/388.2; 427/388.4; 427/399
[58] Field of Search .................. 427/385.5, 386, 388.1, 427/388.2, 388.4, 399

[56] References Cited

U.S. PATENT DOCUMENTS

| | | | |
|---|---|---|---|
| 3,245,909 | 4/1966 | Lowe | 252/51.5 |
| 3,474,070 | 10/1969 | Levene | 260/46.5 |
| 3,578,508 | 5/1971 | Pearlman | 148/6.14 |
| 3,865,617 | 2/1975 | Shimizu et al. | 117/113 |
| 4,014,814 | 3/1977 | Zecher | 252/389 |
| 4,086,182 | 4/1978 | Hengelhaupt et al. | 252/182 |
| 4,240,925 | 12/1980 | Tait | 252/389 |
| 4,241,011 | 12/1980 | Hirozawa et al. | 422/13 |
| 4,263,167 | 4/1981 | Mago | 252/391 |
| 4,324,675 | 4/1982 | Barthold et al. | 252/79 |
| 4,325,744 | 4/1982 | Panayappan et al. | 134/4 |
| 4,421,569 | 12/1983 | Dichter et al. | 148/6.14 R |
| 4,424,079 | 1/1984 | Barabas | 134/4 |
| 4,451,296 | 5/1984 | Barabas | 134/4 |
| 4,459,324 | 7/1984 | Gauger et al. | 427/86 |
| 4,510,181 | 4/1985 | Okuno et al. | 427/142 |
| 4,560,724 | 12/1985 | Brabetz et al. | 524/734 |

FOREIGN PATENT DOCUMENTS

| | | |
|---|---|---|
| 165909 | 12/1985 | European Pat. Off. . |
| 1155497 | 4/1985 | United Kingdom . |

OTHER PUBLICATIONS

Leaversuch, R., "Industry Weights Need to Make Polymer Degradable," Packaging, 52 Modern Plastics (1987).

*Primary Examiner*—Joseph L. Schofer
*Assistant Examiner*—J. M. Reddick
*Attorney, Agent, or Firm*—Lowe,Price,LeBlanc,Becker & Shur

[57] ABSTRACT

A method of converting a rusted surface to a durable one comprises applying a composition for converting a rusted metal surface to form durable preparative coatings thereon, the rust conversion composition comprising a reducing agent which will function to reduce trivalent iron to divalent iron on the substrate, an organic monomer which is capable of polymerization in the presence of the reducing agent, on the surface, and a free radical initiator which will function to polymerize the organic monomer to form the durable coating.

15 Claims, No Drawings

METHOD OF CONVERTING RUSTED SURFACE TO A DURABLE ONE

This is a division of application Ser. No. 06/884,175 filed Jul. 7, 1986, now abandoned.

FIELD OF THE INVENTION

This invention relates to rust conversion coatings which are effective to pacify corroded steel surfaces and more particularly to rust conversion compositions which are effective to pacify a corroded steel surface by inducing surface polymerization of a monomeric- or oligomeric based formulation.

BACKGROUND

There is substantial interest and available products which are used to corrosion-proof ferrous substrates. One particular type of product involves substrates. One particular type of product involves conversion of a rusted metallic surface to a usable surface. In general, there are two types of such rust conversion products. These products are rust conversion coatings and rust conversion products. Both products are similar in composition; however, the term "rust conversion coating" is generally reserved for those products which contain film forming polymers or copolymers. Commercial examples of such product types are Neutra-Rust ® and Fertan ®. A common property of these types of products includes the use of acidic aqueous emulsions (pH 1.2–3.0) which, when applied directly to rusted areas results in a black transformation of the rust. Distinctions between the products include viscosity, applicability and subsequent coating of the applied product. In general, such rust conversion products have the disadvantages of lower viscosities which leads to thinner drier films, and require that the treated surface be water rinsed and primed prior to overcoating. Conversely, rust conversion coatings do not usually have to be water rinsed and may serve as primers, or may themselves be incorporated into primer products. However, such products often exhibit decreased penetration of the rusted surface due to the sheer size of the polymeric resin.

Various prior published patents are known which are concerned with rust conversion or rust transforming compositions. For example, U.S. Pat. No. 4,510,181 discloses a corrosion protective coating layer formed on a metal surface by application of a composition comprising a vinyl monomer such as acrylate in combination with an initiator such as peroxide. In U.S. Pat. No. 3,474,070, coatings are prepared by reaction of a silane, a catalytic amount of an iron catalyst and water, the resulting coating then being polymerized by curing.

U.S. Pat. No. 4,421,569 describes the use of polymeric coatings on steel pipes which are provided by graft polymerization of a monomer onto the surface of the pipes. The composition includes a monomer and prepolymer along with a graft initiator and a catalyst such as a peroxide. In U.S. Pat. No. 4,459,324, a coating on a catalytic electrode is provided wherein the coating is formed from a catalyst dispersed in a semiconducting insoluble polymer matrix formed in situ on the substrate.

U.S. Pat. Nos. 4,424,079 and 4,451,296 to Barabas disclose rust removal compositions and processes. In 4,424,079, the composition comprises an aqueous solution of a vinylpyrrolidone/maleic acid polymer. The rust becomes incorporated into the coating during drying and the coating detaches itself from the metal surface for easy removal. In 4,451,296, the coating is an aqueous solution of a copolymer of maleic acid and a monomer having a double bond. The principle of this coating is the same as in 4,424,079. In U.S. Pat. No. 3,578,508, ferrous metal is corrosion-proofed with a solution obtained by treating chromite ore or other oxide with a gallic acid as a chelating agent. In U.S. Pat. No. 4,086,182, a rust transforming composition is provided which is an aqueous dispersion or emulsion of a synthetic binding agent and a complexing agent for the iron, the complexing agent being a polymeric esterification production of an aromatic oxycarboxylic acid containing phenolic groups and an acid anhydride. In U.S. Pat. No. 3,245,909, a non-corrosive lubricating composition is provided which comprises a lubricating oil, a high molecular weight nitrogen containing detergent type additive and a corrosion inhibiting amount of 2,4-dihydroxybenzoic acid. U.S. Pat. No. 4,014,814 to Zecher discloses a corrosion inhibiting composition which comprises a linear water soluble phenol-aldehyde resinous condensation product and a polyphosphate. U.S. Pat. No. 4,324,675 discloses protective additives for radiators which have iron based surfaces, the protective additive being an alkylene glycol based coolant inhibited with one nucleus-substituted benzoic acid and one conventional corrosion inhibitor. U.S. Pat. No. 4,325,744 to Panayappan et al discloses a method for cleaning metal surfaces comprising application of a thick aqueous solution of a water soluble polymer such as polyvinylpyrrolidone in a chelating agent such as ethylenediaminetetraacetic acid. U.S. Pat. No. 4,240,925 to Taft discloses a method for inhibiting corrosion by application of a composition comprising mixtures of organic anodic and cathodic corrosion inhibitors, in particular a phosphoric acid ester amide, amide-ester or combination thereof and a carboxylic, sulfonic, sulfate or acidic SH group containing compound. U.S. Pat. No. 4,241,011 describes antifreeze and coolant concentrates comprising an alcohol, a metal salt of a carboxysiloxane and an organic basic pH buffer material and a conventional corrosion inhibitor such as a hydroxybenzoic acid. U.S. Pat. No. 4,263,167 describes compositions which have resistance to oxidative degradation and which comprise a polyalkylene oxide having incorporated therein a bridged dimer of a hydroxyl substituted aromatic carboxylic acid.

In none of these prior art rust conversion processes, however, are there disclosures of compositions which are effective to provide in situ polymerization of a monomer under conditions whereby the ferrous surface is converted from the trivalent to the divalent state and whereby the monomer polymerizes within the rust surface to form an effective and permanent coating on the rusted surface.

SUMMARY OF THE INVENTION

It is accordingly one object of the present invention to provide an improved rust conversion composition and method for treatment of a rusted iron surface.

A further object of the invention is to provide a method for conversion of a rusted iron surface to a condition whereby the surface is in a form for application of further coatings such as paint.

A still further object of the present invention is to provide a composition for application to a rusted metal surface which utilizes the principle of in situ polymerization to convert the surface to a form which will serve as a chemical surface preparative for a rusted steel prior to painting.

Other objects and advantages of the invention will become apparent as the description thereof proceeds.

In satisfaction of the foregoing objects and advantages, the present invention provides a rust conversion composition which comprises:

(a) a reducing agent which will function to reduce trivalent iron to divalent iron on the rusted iron surface;

(b) an organic monomer which is capable of polymerization in the presence of the reducing agent; and (c) a free radical initiator which will function to cause polymerization of the organic monomer in the coating.

Also provided are methods for application of this composition to rusted iron surfaces in order to convert the rusted iron surfaces to inert substrates suitable for the application of subsequent coatings thereon by elimination of the necessity for rust removal before overcoating.

DETAILED DESCRIPTION OF THE INVENTION

The present invention provides a novel rust conversion composition which is effective to pacify a corrosive iron or steel surface so as to convert the rusted surface into an inert surface which makes the substrate suitable for application of subsequent coatings such as paint. This invention, therefore, eliminates the necessity for rust removal from iron and steel surfaces prior to application of other coatings such as paint. The inventive composition is a surface polymerized conversion coating which thus serves as a chemical surface preparative for rusted iron and steel to eliminate rust removal procedures which are expensive and difficult prior to repainting or painting of the surface.

The rust conversion composition coating of the present invention comprises:

(a) a reducing agent which will function to reduce trivalent iron to divalent iron in the substrate;

(b) an organic monomer which is capable of polymerization in the presence of the reducing agent; and (c) a free radical initiator which will function polymerize the organic monomer on the surface.

The rust conversion composition of the present invention is composed principally of an organic monomer which will polymerize upon the conversion of trivalent iron to divalent iron. This rust conversion product has improved rust penetrating ability, and therefore forms a more permanent coating than prior known products of this type. Moreover, since polymerization is induced after the monomer has penetrated the rust layer to some extent, the forming polymer will encapsulate the converted iron to result in a more durable coating. It is theorized that the polymer crosslinks with itself and encapsulates the converted iron species in formation of the durable coating.

As pointed out above, the composition of the present invention comprises a reducing agent, an organic monomer or oligomer, and a free radical initiator. The reducing agent is any compound which is capable or will function to reduce trivalent iron to divalent iron on the rusted surface. This component in particular comprises polyhydroxylated compounds such as catechol, pyrogallol, gallic acid, ascorbic acid and the like as well as mixtures thereof. Also included are reducing agents such as sodium formaldehydrosulfoxylate. In general, however, it should be understood that any reducing agent is effective for use in the present invention so long as it is compatible with the other reactants and will function in the composition when applied to the rusted surface to convert or reduce trivalent iron to its divalent state. The monomer used in the composition is any monomer which is water soluble or water emulsifiable and will polymerize when applied to the surface. The monomer is preferably acrylic acid and acrylic acid derivatives such as methylmethacrylate. While the polymerizable component is referred to as a monomer, it should also be understood that one can use oligomers, prepolymers and the like. Also mixtures of monomers, oligomers and prepolymers can be used. The preferred monomer is acrylic acid or methylmethacrylate.

The free radical initiator is any stable radical initiator such as a hydroperoxide including organic hydroperoxides such as t-butyl hydroperoxide, cumene hydroperoxide, mixtures thereof and the like. Hydroperoxide free radical initiators of this type are well known in the art and need not be further described.

The composition may be applied to the rusted iron or steel surface at ambient temperature and may be maintained on the rusted surface for 12 to 48 hours. The composition may further comprise a thickener and may be applied to a vertical rusted iron or steel surface.

The method of the invention utilizes, in a particular embodiment thereof, a monomer such as acrylic acid, methylmethacrylate mixtures of acrylic acid and methylmethacrylate epoxy alkyds, glycol ethers or glycol acetates.

The above composition is provided in the preferred embodiment as an aqueous solution or aqueous emulsion. In general, the aqueous solution or emulsion would contain about 1-15 wt. % of the reducing agent, about 0.05 to 30.0 wt. % of the free radical initiator, and about 20-50 wt. % of the polymerizable monomer. More preferred ratios of these reactants would include about 2-8 wt. % of the reducing agent, about 0.05 to 0.5 wt. % of the free radical initiator, and about 25-35 wt. % of the polymerizable monomer, all of these ratios being based on 100 parts of solvent.

In a further embodiment, the composition can also be provided in a form in which a solvent is not used. These compositions would preferably include the use of oligomer or prepolymers of the polymerizable monomer which could be present in amounts of 70-80 wt. % in concentration. Equivalent amounts of the free radical initiator and reducing agent would then also be present. In this embodiment, the mixture would eliminate the necessity for solvent removal after application of the coating.

The composition may contain 70-80 wt. % of an oligomer or prepolymer, 1-15 wt. % of the reducing agent and 0.05 to 30 wt. % of the free radical initiator.

In use, the composition of the invention is applied to the rusted iron or steel surface. Preferably, excess rust is removed mechanically as by use of a water brush. The composition of the invention is applied as a coating and permitted to react with the metal surface. During this reaction, the conversion coating is formed by inducing surface polymerization of the monomeric based formulation during which reaction, the reducing agent serves to reduce the trivalent iron to divalent iron. Simultaneously, the hydroperoxide free radical initiator causes in situ polymerization of the organic monomer or prepolymer. As polymerization occurs, the monomer will have penetrated the rust layer to some extent so that the polymerization causes cross linking within the polymer itself including encapsulation of the converted iron species. This results in the durable permanent coating. While not being bound by any theory involving the invention, it is believed that the chemistry of the invention proceeds through chelation of the iron with the reducing agent, reduction, and polymerization. A theoretical basis for these reactions is set forth in the following equations:

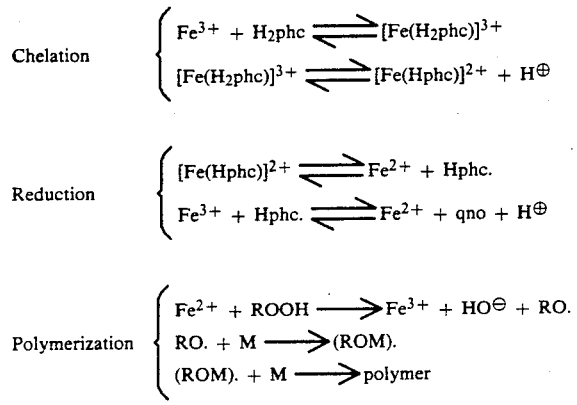

The following examples are presented to illustrate the invention but the invention is not to be considered as limited thereto. In these examples and throughout the specification, parts are by weight unless otherwise indicated.

EXAMPLE 1

This example illustrates the concept of the invention in which samples of various iron catalysts were added to monomeric solutions. The monomeric solutions to which the iron catalysts were added are set forth in the following table 1. The solutions were permitted to react at 25° C. for 24 hours after which the remaining residue was analyzed by GPC (gradient pressure chromatography). As shown in the table, both the pyrogallol-containing and those solutions which did not contain the pyrogallol gave species of similar molecular weight distributions. Moreover, the addition of the FeCl$_3$ catalysts to a pyrogallol-containing solution resulted in the formation of high molecular weight (MW$_w$=33,532) whereas addition of FeCl$_3$ to a non pyrogallol-containing solution did not provide the polymerized high molecular weight material. The polymeric material (MW$_w$—2156) that is detected in the non pyrogallol solutions is probably present because of an O$_2$/ROH induced polymerization of acrylic acid.

TABLE 1

| IRON CATALYZED POLYMERIZATION | | | |
|---|---|---|---|
| Monomer | Reducing/Chelating Reagent | Iron Catalysis | MW$_w$ |
| Acrylic Acid | pyrogallol | Fe$^{3+}$/Fe$^{2+}$ oxides | 3544; 42381 |
| Acrylic Acid | pyrogallol | FeCl$_3$ | 4152; 33532 |
| Acrylic Acid | — | FeCl$_3$ | 2156; — |

*0.3 wt % t-butyl hydroperoxide was used as initiator in 31 wt % monomer diluted in water.

It was concluded from these experiments that the reducing and chelating reagent pyrogallol was effective to reduce the iron and that the monomer polymerized during the reaction.

EXAMPLE 2

In this experiment, aqueous solutions containing 30.0 wt. % of acrylic acid, 0.07 wt. % of t-butyl peroxide, and 5.0 wt. % of pyrogallol as a reducing/chelating agent were formulated. These components were contained in 64.93 wt. % of water to result in 100 parts as a solution.

This formulation was then applied to a partially rusted steel panel at 25° C. and then permitted to remain on the panel for 24 hours. After the 24 hour period, there resulted a glossy black coating, portions of which were scraped off and submitted for GPC analysis. Results from GPC analysis showed the material to be composed of species having molecular weights of 3852 and 29033, respectively.

The invention has been described herein with reference to certain preferred embodiments. However, as obvious variations thereon will become apparent to those skilled in the art, the invention is not to be considered as limited thereto.

What is claimed is:

1. A method for converting a rusted surface into a durable surface suitable for the application of further coatings, comprising
    applying to said rusted surface a composition comprising
    (a) a reducing agent which is compatible with the other reactants and will function to reduce trivalent iron to divalent iron;
    (b) 20-50 wt. % of an organic monomer or 70-80 wt. % of an organic oligomer which is capable of polymerization in the presence of the reducing agent and ferric ions; and
    (c) a stable free radical initiator which will function to polymerize the organic monomer wherein when said rust conversion composition is applied to a rusted surface in situ polymerization occurs which results in a durable coating.

2. The method of claim 1, wherein:
    the composition is applied to said surface at ambient temperature, and it is maintained on the rusted surface for 12 to 48 hours.

3. The method of claim 1, wherein:
    the composition further comprises a thickener, and the rusted surface is a vertical rusted iron or steel surface.

4. The method of claim 1, wherein:
    the polymerizable component is either a water-soluble monomer, a water emulsifiable monomer, an oligomer, or a prepolymer wherein said polymerizable component will polymerize when applied to said rusted surface.

5. The method of claim 1, wherein:
    the reducing agent in the composition comprises a polyhydroxylated compound.

6. The method of claim 1, wherein:
    the reducing agent is selected from the group consisting of catechol, pyrogallol, gallic acid, ascorbic acid and sodium formaldehydrosulfoxylate.

7. The method of claim 1, wherein:
    the organic monomer or oligomer is capable of polymerizing if selected from the group consisting of monomers, oligomers and mixtures thereof.

8. The method of claim 4, wherein:
    the monomer is selected from the group consisting of acrylic acid, methylmethacrylate, mixtures of acrylic acid and methylmethacrylate, epoxy alkyds, glycol ethers and glycol acetates.

9. The method of claim 1, wherein:
the free radical initiator in the composition is a hydroperoxide.

10. The method of claim 1, wherein:
the applied composition is an aqueous solution or emulsion comprising based on 100 parts of the solution or emulsion
about 1–15 wt. % reducing agent,
about 20–50 wt. % polymerizable monomer, and
about 0.05–30 wt. % free radical initiator.

11. The method of claim 1, wherein:
the applied composition comprises
70–80 wt. % oligomer,
1–15 wt. % reducing agent, and
0.05 to 30 wt. % free radical initiator.

12. A method for converting a rusted surface to a durable surface suitable for the application of further coating, comprising
applying to the rusted surface a composition comprising
(a) a reducing agent which will function to reduce trivalent iron to divalent iron, said reducing agent comprising a polyhydroxylated compound;
(b) an organic monomer which is capable of polymerization in the presence of the reducing agent, said organic monomer being selected from the group consisting of acrylic acid, methylmethacrylate and mixtures thereof; and
(c) a free radical initiator which will function to polymerize the organic monomer, said free radical initiator comprising an organic hydroperoxide.

13. The method of claim 1, wherein
the applied composition comprises as a reducing agent ascorbic acid, as an organic monomer methylmethacrylate and as an organic oligomer an oligomer of methylmethacrylate.

14. The method of claim 1, wherein:
the composition further comprises a prepolymer, and the rusted surface is a rusted iron or steel surface.

15. The method of claim 9, wherein the hydroperoxide is t-butyl hydroperoxide, cumene hydroperoxide, or a mixture thereof.

* * * * *